(12) United States Patent
Ohashi (10) Patent No.: US 11,204,502 B2
(45) Date of Patent: Dec. 21, 2021

(54) IMAGE GENERATION APPARATUS, HEAD MOUNTED DISPLAY, IMAGE GENERATION SYSTEM, IMAGE GENERATION METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 12 days.

(21) Appl. No.: 16/762,786

(22) PCT Filed: Nov. 13, 2018

(86) PCT No.: PCT/JP2018/042003
§ 371 (c)(1),
(2) Date: May 8, 2020

(87) PCT Pub. No.: WO2019/098198
PCT Pub. Date: May 23, 2019

(65) Prior Publication Data
US 2021/0191124 A1 Jun. 24, 2021

(30) Foreign Application Priority Data
Nov. 20, 2017 (JP) .............................. JP2017-222897

(51) Int. Cl.
*G02B 27/01* (2006.01)
*G06T 19/00* (2011.01)
(Continued)

(52) U.S. Cl.
CPC .......... *G02B 27/0172* (2013.01); *G06T 15/20* (2013.01); *G06T 19/006* (2013.01);
(Continued)

(58) Field of Classification Search
CPC ............ G02B 27/0172; G02B 27/0093; G02B 2027/014; G06T 15/20; G06T 19/006;
(Continued)

(56) References Cited

U.S. PATENT DOCUMENTS 10,306,214 B2   5/2019 Ohashi
2016/0252955 A1 9/2016 Yamamoto
(Continued)

FOREIGN PATENT DOCUMENTS

| JP | 2015191314 A | 11/2015 |
|----|--------------|---------|
| JP | 2016024273 A | 2/2016 |
| WO | 2015098292 A1 | 7/2015 |

OTHER PUBLICATIONS

International Search Report for corresponding PCT Application No. PCT/JP2018/042003, 3 pages, dated Dec. 11, 2018.
(Continued)

*Primary Examiner* — Lixi C Simpson
(74) *Attorney, Agent, or Firm* — Matthew B. Dernier, Esq.

(57) ABSTRACT

A rendering section renders an object in a virtual space to generate a computer graphics image. A post-process section post-processes the computer graphics image. A transmitting and receiving section transmits the post-processed computer graphics image together with depth information to a head mounted display for superimposing the post-processed computer graphics image on a captured image in a real space.

4 Claims, 10 Drawing Sheets

(51) Int. Cl.
  *G06T 15/20* (2011.01)
  *A63F 13/25* (2014.01)
  *G02B 27/00* (2006.01)

(52) U.S. Cl.
  CPC ......... *A63F 13/25* (2014.09); *A63F 2300/308* (2013.01); *A63F 2300/6661* (2013.01); *G02B 27/0093* (2013.01); *G02B 2027/014* (2013.01)

(58) Field of Classification Search
  CPC ............... A63F 13/25; A63F 2300/308; A63F 2300/6661
  See application file for complete search history.

(56) References Cited

U.S. PATENT DOCUMENTS

| | | |
|---|---|---|
| 2016/0364904 A1 | 12/2016 | Parker |
| 2016/0366392 A1* | 12/2016 | Raghoebardajal ... H04N 13/161 |
| 2017/0180712 A1 | 6/2017 | Ohashi |
| 2017/0228923 A1* | 8/2017 | Kashihara ............... G06T 15/20 |
| 2017/0372457 A1* | 12/2017 | Sylvan .................... G06F 3/011 |
| 2018/0268511 A1* | 9/2018 | Sorbo ..................... A63F 13/53 |

OTHER PUBLICATIONS

International Preliminary Report for Patentability and Written Opinion for corresponding PCT Application No. PCT/JP2018/042003, 15 pages, dated Jun. 4, 2020.

* cited by examiner

IMAGE GENERATION APPARATUS, HEAD MOUNTED DISPLAY, IMAGE GENERATION SYSTEM, IMAGE GENERATION METHOD, AND PROGRAM

TECHNICAL FIELD

The present invention relates to an image generation apparatus, a head mounted display, an image generation system, and an image generation method.

BACKGROUND ART

A user wears a head mounted display connected to a game console on the user's head, and plays a game by operating a controller or the like while viewing a screen displayed on the head mounted display. When wearing the head mounted display, the user does not view anything but a video displayed on the head mounted display, and effects of enhancing a sense of immersion into a video world and further improving entertainment of the game are, therefore, produced. Furthermore, by displaying a virtual reality (VR) video on the head mounted display, causing the user wearing the head mounted display on the head to rotate the head, and displaying a virtual space where the user can take a 360-degree view, the sense of immersion into the video is further enhanced and operability of an application such as the game is improved.

Furthermore, while a user wearing a non-see-through head mounted display is unable to directly view an outside world, a video see-through head mounted display capable of capturing a video in the outside world by a camera mounted in the head mounted display and displaying the video on a display panel is also known. The video see-through head mounted display can generate and display an augmented reality (AR) video by superimposing an object in a virtual world generated by computer graphics (CG) on the video in the outside world captured by the camera. The augmented reality video is, unlike virtual reality disconnected from a real world, is created by augmenting the real world with a virtual object, so that the user can experience the virtual world while being conscious of connection to the real world.

SUMMARY

Technical Problems

In a case of displaying the augmented reality video on the head mounted display, the video in the outside world is captured by the camera mounted in the head mounted display at a high frame rate to be interlocked with a motion of the user's head. In contrast, it takes long time for rendering the virtual world to be superimposed, and a frame rate of the video in the virtual world is lower than that of the video in the outside world captured by the camera. Owing to this, it is impossible to generate the augmented reality video to fit the high frame rate of the camera, which causes the user to feel a subtle delay in the augmented reality video and to lose the feel of connection to the real world.

The present invention has been achieved in light of such problems, and an object of the present invention is to provide an image generation apparatus, a head mounted display, an image generation system, and an image generation method capable of improving a quality of an augmented reality video.

Solution to Problems

To solve the problems, an image generation apparatus according to one aspect of the present invention includes a rendering section that renders an object in a virtual space to generate a computer graphics image, an image-with-alpha generation section that generates a computer graphics image with alpha on the basis of depth information regarding a captured image in a real space provided from a head mounted display, a reprojection section that converts the computer graphics image with alpha so as to fit a new viewpoint location or a new line-of-sight direction, and a transmitting section that transmits the reprojection-processed computer graphics image with alpha to the head mounted display.

Another aspect of the present invention is a head mounted display. This head mounted display includes a reprojection section that converts a captured image in a real space so as to fit a new viewpoint location or a new line-of-sight direction, a receiving section that receives a computer graphics image with alpha, and a superimposition section that superimposes the computer graphics image with alpha on the reprojection-processed captured image in the real space to generate an augmented reality image.

Yet another aspect of the present invention is an image generation system. This image generation system is an image generation system including a head mounted display, and an image generation apparatus, and the image generation apparatus includes a rendering section that renders an object in a virtual space to generate a computer graphics image, an image-with-alpha generation section that generates a computer graphics image with alpha on the basis of depth information regarding a captured image in a real space provided from the head mounted display, a first reprojection section that converts the computer graphics image with alpha so as to fit a new viewpoint location or a new line-of-sight direction, and a transmitting section that transmits the reprojection-processed computer graphics image with alpha to the head mounted display. The head mounted display includes a second reprojection section that converts the captured image in the real space so as to fit the new viewpoint location or the new line-of-sight direction, a receiving section that receives the computer graphics image with alpha from the image generation apparatus, and a superimposition section that superimposes the computer graphics image with alpha on the reprojection-processed captured image in the real space to generate an augmented reality image.

Still another aspect of the present invention is an image generation method. This method includes a rendering step of rendering an object in a virtual space to generate a computer graphics image, an image-with-alpha generating step of generating a computer graphics image with alpha on the basis of depth information regarding a captured image in a real space provided from a head mounted display, a reprojection step of converting the computer graphics image with alpha so as to fit a new viewpoint location or a new line-of-sight direction, and a transmitting step of transmitting the reprojection-processed computer graphics image with alpha to the head mounted display.

Yet another aspect of the present invention is an image generation apparatus. This apparatus includes a rendering section that renders an object in a virtual space to generate a computer graphics image, and a transmitting section that transmits the computer graphics image together with depth information to a head mounted display for superimposing the computer graphics image on a captured image in a real space.

Still another aspect of the present invention is a head mounted display. This head mounted display includes a first reprojection section that converts a captured image in a real space so as to fit a new viewpoint location or a new line-of-sight direction, a receiving section that receives a computer graphics image with depth information, a second reprojection section that converts the computer graphics image so as to fit the new viewpoint location or the new line-of-sight direction, and a superimposition section that generates an augmented reality image by superimposing the reprojection-processed computer graphics image with the depth information on the reprojection-processed captured image in the real space with reference to the depth information per pixel.

Yet another aspect of the present invention is an image generation system. This image generation system is an image generation system including a head mounted display, and an image generation apparatus. This image generation system includes a rendering section that renders an object in a virtual space to generate a computer graphics image, and a transmitting section that transmits the computer graphics image together with depth information to the head mounted display for superimposing the computer graphics image on a captured image in a real space. The head mounted display includes a first reprojection section that converts the captured image in the real space so as to fit a new viewpoint location or a new line-of-sight direction, a receiving section that receives the computer graphics image with the depth information from the image generation apparatus, a second reprojection section that converts the computer graphics image so as to fit the new viewpoint location or the new line-of-sight direction, and a superimposition section that generates an augmented reality image by superimposing the reprojection-processed computer graphics image with the depth information on the reprojection-processed captured image in the real space with reference to the depth information per pixel.

Still another aspect of the present invention is an image generation method. This method includes a first reprojection step of converting a captured image in a real space so as to fit a new viewpoint location or a new line-of-sight direction, a receiving step of receiving a computer graphics image with depth information, a second reprojection step of converting the computer graphics image so as to fit the new viewpoint location or the new line-of-sight direction, and a superimposing step of generating an augmented reality image by superimposing the reprojection-processed computer graphics image with the depth information on the reprojection-processed captured image in the real space with reference to the depth information per pixel.

It is noted that conversion of optional combinations of the aforementioned constituent elements and expressions of the present invention among a method, an apparatus, a system, a computer program, a data structure, a recording medium, and so forth is also effective as an aspect of the present invention.

Advantageous Effect of Invention

According to the present invention, it is possible to improve a quality of an augmented reality video.

DESCRIPTION OF EMBODIMENTS

Figure 1:
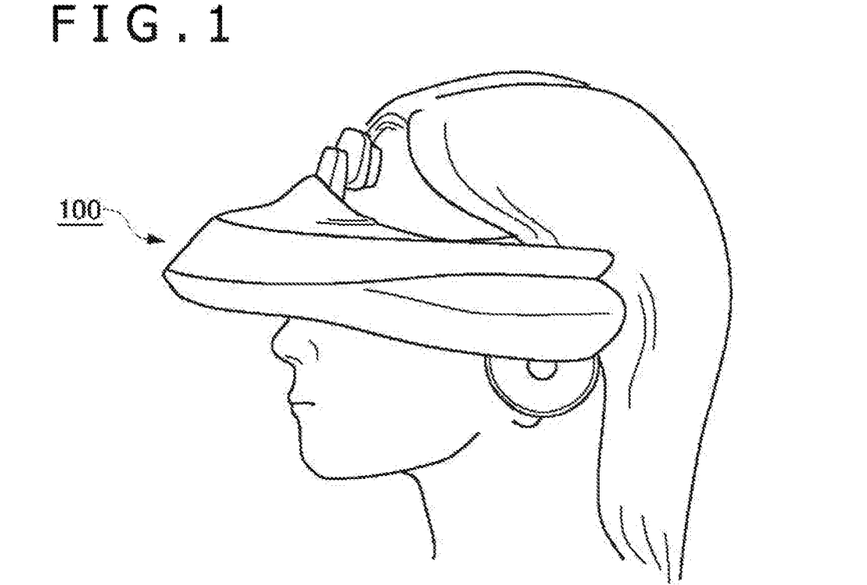
FIG. 1 is an external view of a head mounted display.

FIG. 1 is an external view of a head mounted display 100. The head mounted display 100 is a display device worn on a head of a user so that the user can view a still image, a moving image, or the like displayed on a display and listen to audio, music, or the like output from a headphone.

A gyro sensor, an acceleration sensor, or the like incorporated into or externally attached to the head mounted display 100 can measure position information regarding the head of the user wearing the head mounted display 100 and orientation information such as a rotational angle, an inclination, and the like of the head.

A camera unit is mounted in the head mounted display 100, and the camera unit can capture an image of an outside world while the user is wearing the head mounted display 100.

The head mounted display 100 is an example of a "wearable display." Here, a method of generating an image that is displayed on the head mounted display 100 is described. The method of generating an image according to the present embodiment is, however, applicable not only to the head mounted display 100 in a narrow sense but also to a case where glasses, a glass-type display, a glass-type camera, a headphone, a headset (headphone equipped with a microphone), earphones, earrings, an ear-hanging camera, a hat, a hat equipped with a camera, a hairband, or the like is worn.

Figure 2:
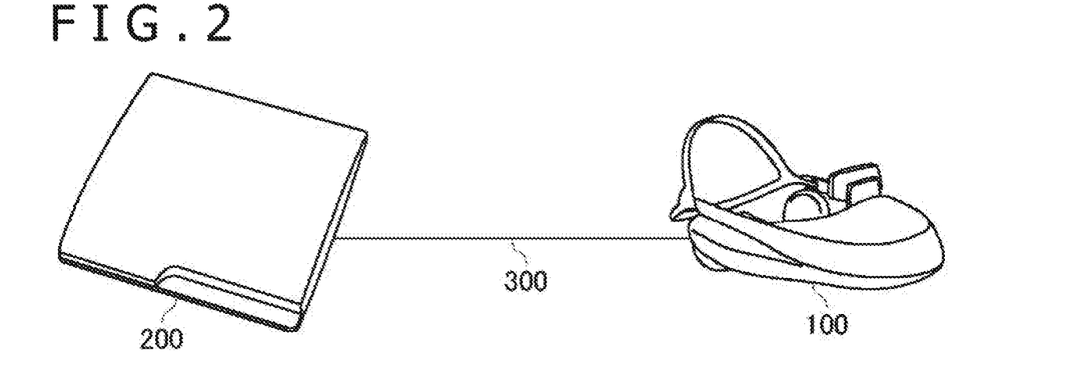
FIG. 2 is a configuration diagram of an image generation system according to the present embodiment.

FIG. 2 is a configuration diagram of an image generation system according to the present embodiment. By way of example, the head mounted display 100 is connected to an image generation apparatus 200 via an interface 300 such as a High-Definition Multimedia Interface (registered trademark) (HDMI) that is a standard of communication interfaces for transmitting a video and audio as a digital signal.

The image generation apparatus 200 predicts position and orientation information regarding the head mounted display 100 from current position and orientation information regarding the head mounted display 100 in consideration of a delay from generation of a video to display of the video, renders an image to be displayed on the head mounted display 100 using the predicted position and orientation information regarding the head mounted display 100 as a premise, and transfers the image to the head mounted display 100.

The image generation apparatus 200 is, for example, a game console. The image generation apparatus 200 may be further connected to a server via a network. In that case, the server may provide an online application of a game or the like in which a plurality of users can participate via the network, to the image generation apparatus 200. The head mounted display 100 may be connected to a computer or a mobile terminal as an alternative to the image generation apparatus 200.

An underlying technology of the present embodiment will be described with reference to FIGS. 3 to 5.

Figure 3:
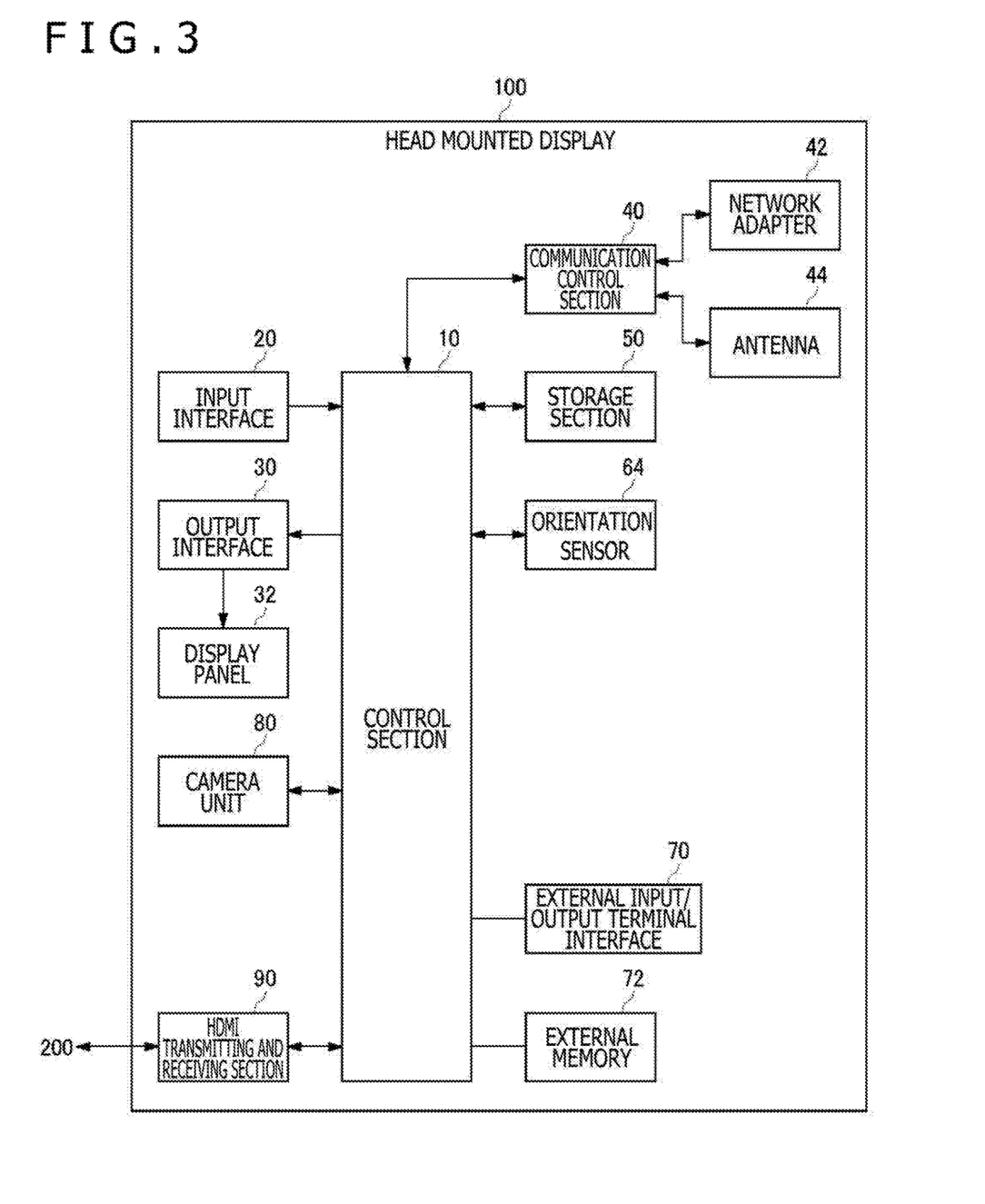
FIG. 3 is a functional configuration diagram of a head mounted display according to an underlying technology.

FIG. 3 is a functional configuration diagram of a head mounted display 100 according to the underlying technology.

A control section 10 is a main processor that processes signals such as an image signal and a sensor signal, an instruction, or data to output. An input interface 20 receives an operation signal or a setting signal from the user and supplies the operation signal or the setting signal to the control section 10. An output interface 30 receives an image signal from the control section 10 and displays an image on a display panel 32.

A communication control section 40 transmits the data input from the control section 10 to outside via a network adapter 42 or an antenna 44 by wired or wireless communication. The communication control section 40 receives data from the outside via the network adapter 42 or the antenna 44 by wired or wireless communication and outputs the data to the control section 10.

A storage section 50 temporarily stores data, parameters, an operation signal, and the like that are processed by the control section 10.

An orientation sensor 64 detects position information regarding the head mounted display 100 and orientation information such as a rotational angle and an inclination of the head mounted display 100. The orientation sensor 64 is realized by a combination of a gyro sensor, an acceleration sensor, an angular acceleration sensor, and the like as appropriate. With the use of a motion sensor achieved by a combination of at least one of a three-axis geomagnetic sensor, a three-axis acceleration sensor, and a three-axis gyro (angular velocity) sensor, the front-back, left-right, and up-down motions of the head of the user may be detected.

An external input/output terminal interface 70 is an interface for connecting peripheral equipment such as a universal serial bus (USB) controller to the head mounted display 100. An external memory 72 is an external memory such as a flash memory.

A camera unit 80 includes components necessary for image capturing, such as a lens, an image sensor, and a ranging sensor, and supplies a captured outside world video and depth information to the control section 10. The control section 10 controls focusing and zooming of the camera unit 80, for example.

An HDMI transmitting and receiving section 90 transmits and receives video and audio digital signals to and from the image generation apparatus 200 in accordance with the HDMI. The HDMI transmitting and receiving section 90 receives the video in the outside world captured by the camera unit 80 and the depth information from the control section 10, and transmits the video in the outside world and the depth information to the image generation apparatus 200 through an HDMI channel. The HDMI transmitting and receiving section 90 receives an image generated by the image generation apparatus 200 from the image generation apparatus 200 through the HDMI channel, and supplies the image to the control section 10.

The control section 10 can supply an image and text data to the output interface 30 to display the image and the text data on the display panel 32, and can supply the image and the text data to the communication control section 40 to transmit to the outside.

The image generation apparatus 200 is notified of a current position and current orientation information regarding the head mounted display 100 detected by the orientation sensor 64 via the communication control section 40 or the external input/output terminal interface 70. Alternatively, the HDMI transmitting and receiving section 90 may transmit the current position and orientation information regarding the head mounted display 100 to the image generation apparatus 200.

Figure 4:
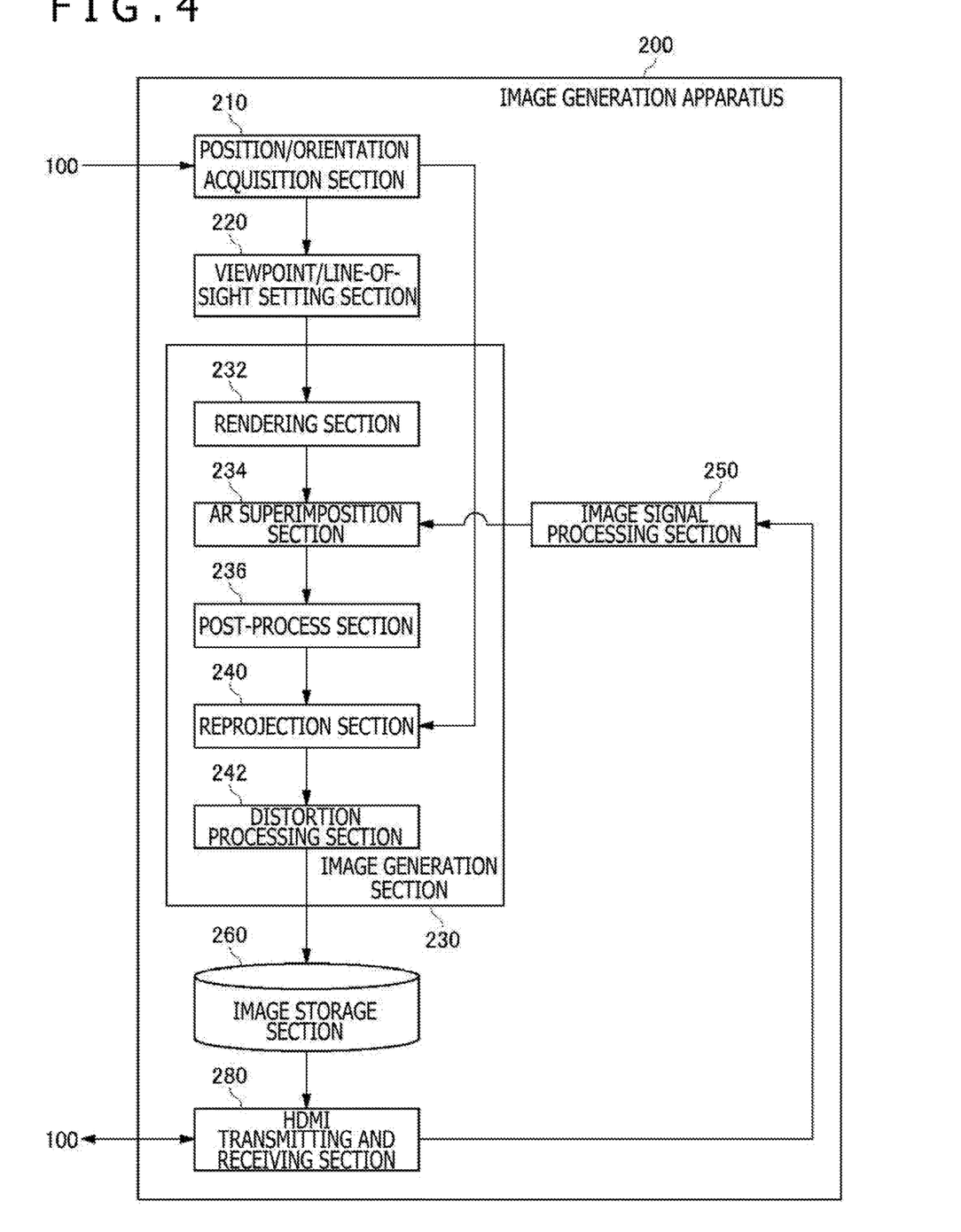
FIG. 4 is a functional configuration diagram of an image generation apparatus according to the underlying technology.

FIG. 4 is a functional configuration diagram of the image generation apparatus 200 according to the underlying technology. FIG. 4 is a block diagram focusing on functions, and these functional blocks can be realized in various forms by hardware only, software only, and a combination of the hardware and the software.

At least some functions of the image generation apparatus 200 may be implemented in the head mounted display 100. Alternatively, at least some functions of the image generation apparatus 200 may be implemented in the server connected to the image generation apparatus 200 via the network.

A position/orientation acquisition section 210 acquires the current position and orientation information regarding the head mounted display 100 from the head mounted display 100.

A viewpoint/line-of-sight setting section 220 sets a viewpoint location and a line-of-sight direction of the user using the position and orientation information regarding the head mounted display 100 acquired by the position/orientation acquisition section 210.

An HDMI transmitting and receiving section 280 receives a video in a real space captured by the camera unit 80 from the head mounted display 100, and supplies the video in the real space to an image signal processing section 250.

The image signal processing section 250 performs image signal processing (ISP) such as RGB conversion (mosaic processing), white balance, color correction, and noise reduction on a Raw image captured by the camera unit 80 in the head mounted display 100, and further performs distortion correction processing for eliminating a distortion or the like caused by an optical system of the camera unit 80. The image signal processing section 250 supplies an RGB image obtained as a result of the image signal processing and the distortion correction processing to an image generation section 230.

The image generation section 230 reads data necessary to generate computer graphics from the image storage section 260, generates a CG image by rendering an object in a virtual space, generates an augmented reality image by superimposing the CG image on a camera image in the real space provided from the image signal processing section 250, and outputs the augmented reality image to the image storage section 260.

The image generation section 230 includes a rendering section 232, an AR superimposition section 234, a post-process section 236, a reprojection section 240, and a distortion processing section 242.

The rendering section 232 renders the object in the virtual space viewed from a viewpoint location of the user wearing the head mounted display 100 in a line-of-sight direction in accordance with the viewpoint location and the line-of-sight direction of the user set by the viewpoint/line-of-sight setting section 220, and supplies the object in the virtual space to the AR superimposition section 234.

The AR superimposition section 234 generates the augmented reality image by superimposing the CG image generated by the rendering section 232 on the camera image supplied from the image signal processing section 250, and supplies the augmented reality image to the post-process section 236.

The post-process section 236 performs post-processing such as depth of field adjustment, tone mapping, and antialiasing on the augmented reality image, and post-processes the augmented reality image in such a manner that the augmented reality image obtained by superimposing the virtual object on the image in the real space appears natural and smooth.

The reprojection section 240 receives latest position and orientation information regarding the head mounted display 100 from the position/orientation acquisition section 210, performs reprojection processing on the post-processed augmented reality image, and converts the augmented reality image into an augmented reality image viewed from a latest viewpoint location in a latest line-of-sight direction of the head mounted display 100.

Reprojection will now be described. In a case in which the head mounted display 100 takes on a head tracking function and a virtual reality video is generated by changing a viewpoint and a line-of-sight direction to be interlocked with a motion of the user's head, a delay is generated from generation to display of the virtual reality video. As a result, a lag is generated between a direction of the user's head premised at a time of generating the video and a direction of the user's head at a time of displaying the video on the head mounted display 100, and the user often falls into a sense of getting drunk (referred to as "virtual reality sickness (VR sickness)" or the like.)

In this way, it takes long time to detect a motion of the head mounted display 100, issue a rendering command from a CPU, execute rendering by a graphics processing unit (GPU), and output the rendered image to the head mounted display 100. It is assumed, for example, that rendering is executed at a frame rate of 60 fps (frame/second) and that a delay of one frame is generated from the detection of the motion of the head mounted display 100 to the output of the image. This delay is approximately 16.67 milliseconds at the frame rate of 60 fps and sufficient for a person to perceive a lag.

To address the delay, processing referred to as "timewarp" or "reprojection" is performed to correct the rendered image to fit the latest position and the latest orientation of the head mounted display 100, so that it is difficult for a person to perceive the lag.

The distortion processing section 242 performs processing on the reprojection-processed augmented reality image by causing a deformation and a distortion in an image in accordance with a distortion generated in the optical system of the head mounted display 100, and stores the resultant augmented reality image in the image storage section 260.

The HDMI transmitting and receiving section 280 reads frame data of the augmented reality image generated by the image generation section 230 from the image storage section 260, and transfers the frame data to the head mounted display 100 in accordance with the HDMI.

Figure 5:
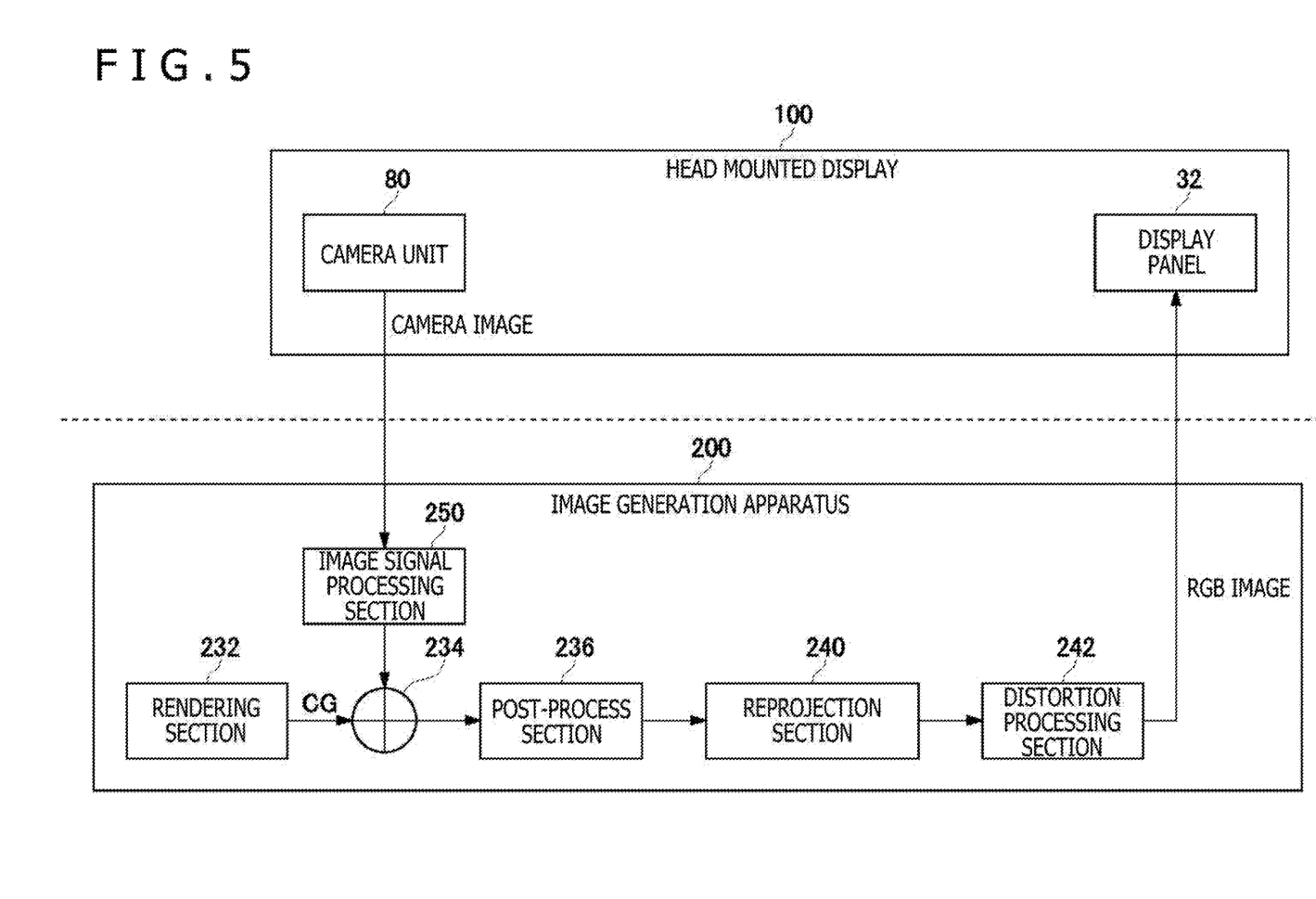
FIG. 5 is an explanatory diagram of a configuration of an image generation system according to the underlying technology for superimposing a CG image on a camera image to generate an augmented reality image.

FIG. 5 is an explanatory diagram of a configuration of the image generation system according to the underlying technology for superimposing the CG image on the camera image and generating the augmented reality image. For the simplicity of description, principal configurations of the head mounted display 100 and the image generation apparatus 200 for generating the augmented reality image will be illustrated and described herein.

The camera image in the outside world captured by the camera unit 80 in the head mounted display 100 is transmitted to the image generation apparatus 200, and supplied to the image signal processing section 250. The image signal processing section 250 performs the image signal processing and the distortion correction processing on the camera image, and supplies the processed camera image to the AR superimposition section 234.

The rendering section 232 in the image generation apparatus 200 generates a virtual object viewed from the viewpoint location and the line-of-sight direction of the user wearing the head mounted display 100, and supplies the virtual object to the AR superimposition section 234.

The AR superimposition section 234 superimposes the CG image on the camera image and generates the augmented reality image. The post-process section 236 post-processes the augmented reality image. The reprojection section 240 converts the post-processed augmented reality image into an augmented reality image to fit the latest viewpoint location and the latest line-of-sight direction. The distortion processing section 242 performs distortion processing on the reprojection-processed augmented reality image. A final RGB image after the distortion processing is transmitted to the head mounted display 100 and displayed on the display panel 32.

In the image generation system according to the underlying technology described above, the CG image is superimposed on the camera image to fit the frame rate of rendering the CG image by the image generation apparatus 200. Since it takes long time to perform the rendering, the frame rate of rendering the video in the virtual space by the rendering section 232 is lower than the frame rate of capturing the video in the real space by the camera unit 80. For example, even in a case in which the camera unit 80 captures an image at 120 fps, the rendering section 232 can perform rendering only at 60 fps. Owing to this, the frame rate of a see-through video displayed on the display panel of the head mounted display 100 falls in proportion to the frame rate of rendering, and the see-through video is fed intermittently, with the result that a sense of reality lacks even in viewing the augmented reality video.

While an image generation system according to several embodiments overcoming the problems with the image generation system according to the underlying technology are described, overlapping description with the underlying technology will be omitted as appropriate, and configurations improved from the underlying technology will be described.

Figure 6:
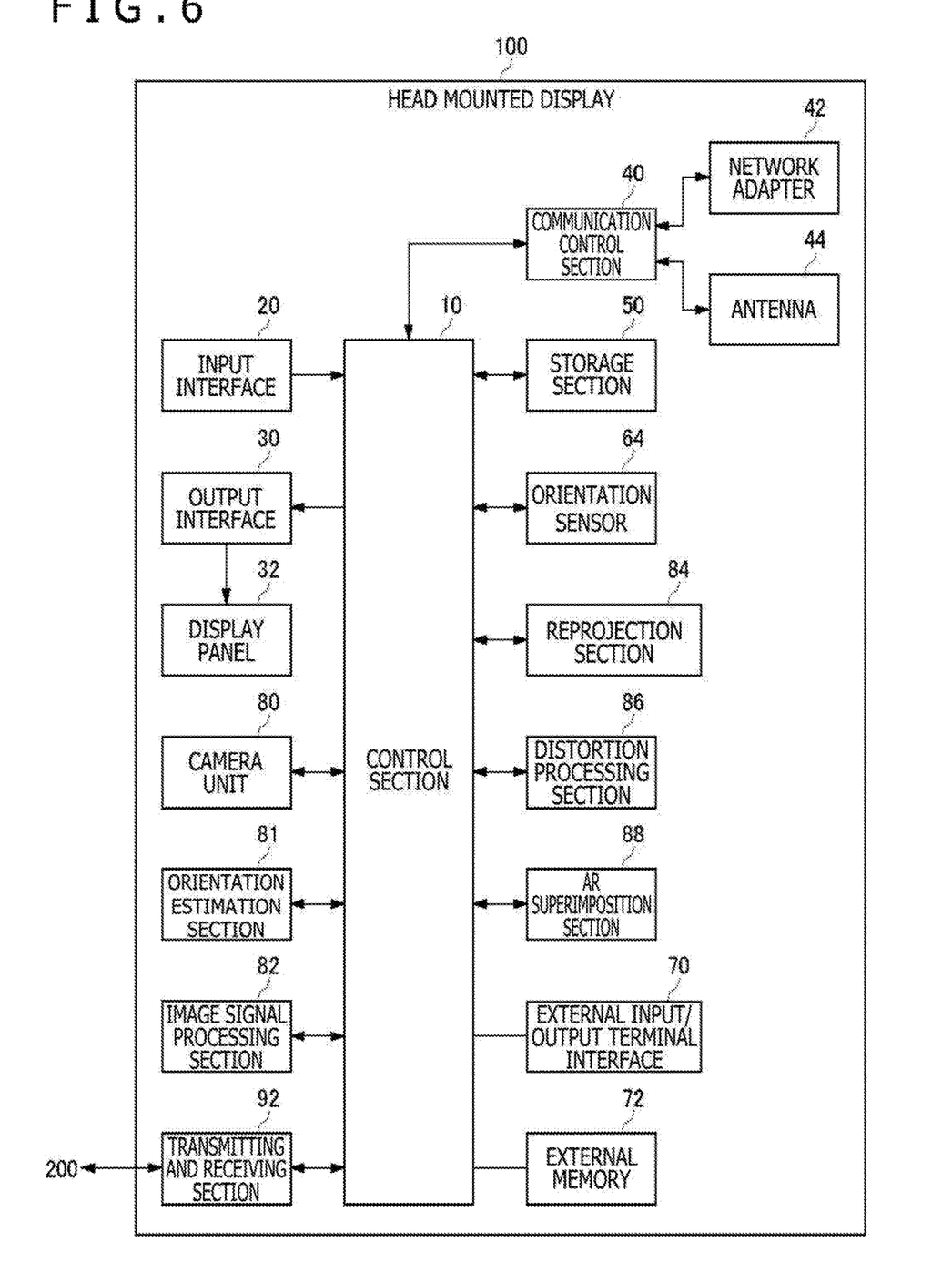
FIG. 6 is a functional configuration diagram of a head mounted display according to a first embodiment.

FIG. 6 is a functional configuration diagram of a head mounted display 100 according to a first embodiment.

An orientation estimation section 81 estimates orientation information (position and rotation) regarding the head mounted display 100 from feature points of an image captured by the camera unit 80. A transmitting and receiving section 92 transmits the orientation information estimated by the orientation estimation section 81 to the image generation apparatus 200.

An image signal processing section 82 performs image processing such as RGB conversion (demosaic processing), white balance, color correction, and noise reduction on a Raw image captured by the camera unit 80, and further performs distortion correction processing for eliminating a distortion or the like caused by the optical system of the camera unit 80. The image signal processing section 82 supplies the image-signal-processed and distortion-correction-processed camera image to the control section 10.

A reprojection section 84 performs the reprojection processing on the camera image on the basis of the latest position and the latest orientation information regarding the head mounted display 100 detected by the orientation estimation section 81 or the orientation sensor 64, and converts the camera image into an image viewed from the latest viewpoint location and the latest line-of-sight direction of the head mounted display 100.

A distortion processing section 86 performs processing for causing a deformation and a distortion in an image in accordance with the distortion generated in the optical system of the head mounted display 100, on the reprojection-processed camera image, and stores the distortion-processed camera image to the control section 10.

An AR superimposition section 88 generates an augmented reality image by superimposing a CG image with alpha generated by the image generation apparatus 200 on the distortion-processed camera image, and supplies the augmented reality image to the control section 10.

The transmitting and receiving section 92 transmits and receives video and audio digital signals to and from the image generation apparatus 200. The transmitting and receiving section 92 receives depth information regarding the camera image from the control section 10, and transmits the depth information to the image generation apparatus 200. The transmitting and receiving section 92 receives an image including the depth information and generated by the image generation apparatus 200 from the image generation apparatus 200, and supplies the image to the control section 10.

Figure 7:
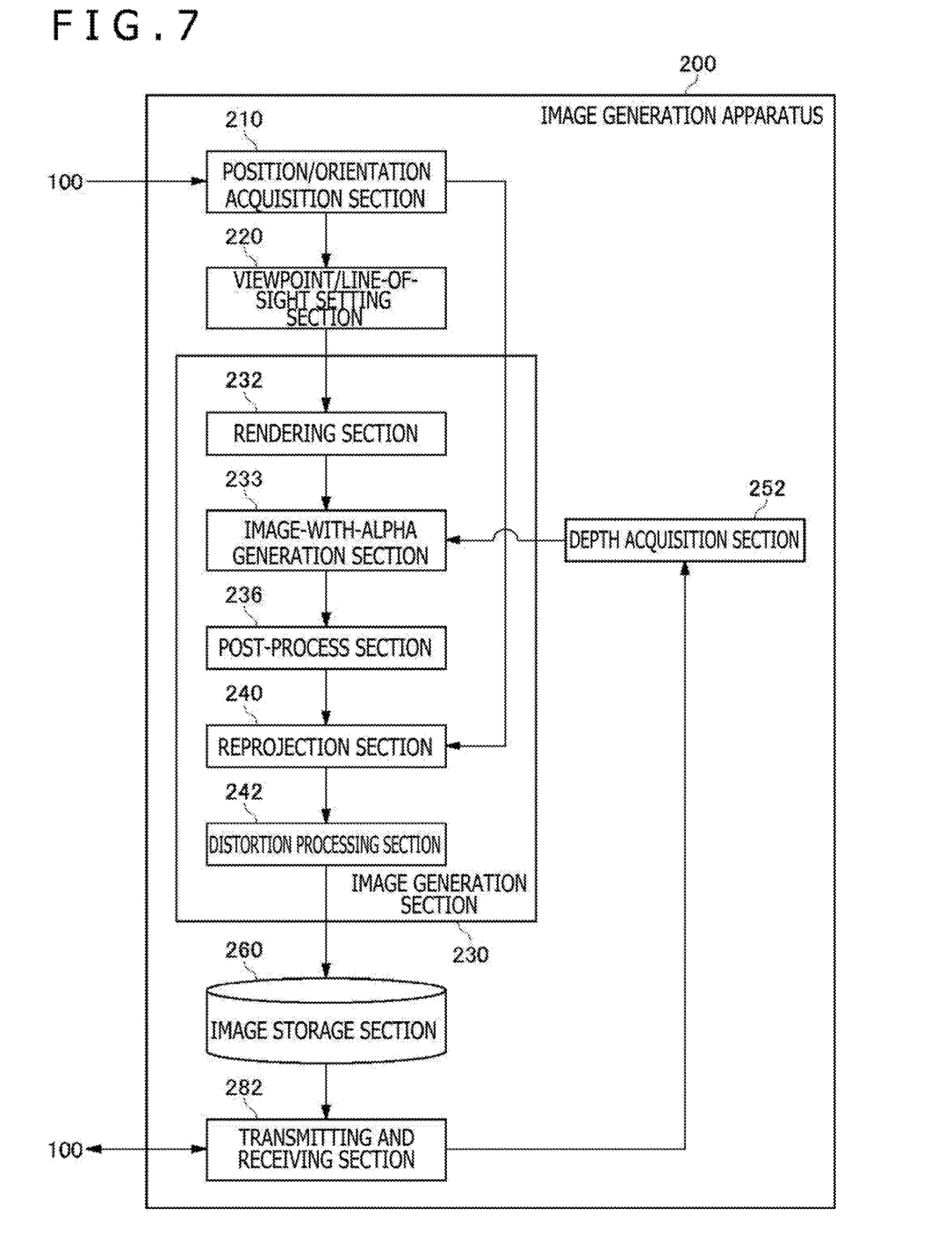
FIG. 7 is a functional configuration diagram of an image generation apparatus according to the first embodiment.

FIG. 7 is a functional configuration diagram of the image generation apparatus 200 according to the first embodiment.

A transmitting and receiving section 282 receives the depth information regarding a video in the real space captured by the camera unit 80 from the head mounted display 100, and supplies the depth information to a depth acquisition section 252.

The image generation section 230 reads data necessary to generate computer graphics from the image storage section 260, generates a CG image by rendering an object in the virtual space, generates a CG image with alpha from the CG image on the basis of the depth information regarding the camera image in the real space provided from the depth acquisition section 252, and outputs the CG image with alpha to the image storage section 260.

The image generation section 230 includes the rendering section 232, an IMAGE-WITH-ALPHA GENERATION SECTION 233, the post-process section 236, the reprojection section 240, and the distortion processing section 242.

The rendering section 232 generates the CG image by rendering the object in the virtual space viewed from the viewpoint location of the user wearing the head mounted display 100 in the line-of-sight direction in accordance with the viewpoint location and the line-of-sight direction of the user set by the viewpoint/line-of-sight setting section 220, and supplies the CG image to the image-with-alpha generation section 233.

The image-with-alpha generation section 233 generates the CG image with alpha from the CG image on the basis of the depth information regarding the camera image supplied from the depth acquisition section 252. Specifically, the image-with-alpha generation section 233 determines a position relationship between the object in the real space and the object in the virtual space, and sets an alpha value in such a manner that a region of a background of the virtual object and an occlusion region invisible and hidden by the object in the real space located in front of the virtual object are transparent in the CG image. The image-with-alpha generation section 233 supplies the CG image with alpha to the post-process section 236.

The post-process section 236 performs post-processing such as depth of field adjustment, tone mapping, and antialiasing on the CG image with alpha, and post-processes the CG image with alpha in such a manner that the CG image with alpha appears natural and smooth.

The alpha value can be set in such a manner that a boundary between the CG image and the camera image is translucent at a time of antialiasing.

The reprojection section 240 receives the latest position and orientation information regarding the head mounted display 100 from the position/orientation acquisition section 210, performs reprojection processing on the post-processed CG image with alpha, and converts the CG image with alpha into a CG image with alpha viewed from the latest viewpoint location and the latest line-of-sight direction of the head mounted display 100.

The distortion processing section 242 performs processing for causing a deformation and a distortion in an image in accordance with a distortion generated in the optical system of the head mounted display 100, on the reprojection-processed CG image with alpha, and stores a resultant CG image with alpha in the image storage section 260.

The transmitting and receiving section 282 reads frame data of the CG image with alpha generated by the image generation section 230 from the image storage section 260, and transfers the CG image with alpha to the head mounted display 100 through a communication interface capable of transferring an RGBA image signal. The RGBA image signal means herein an image signal obtained by adding the alpha value to a color value of each of red, green, and blue per pixel.

Figure 8:
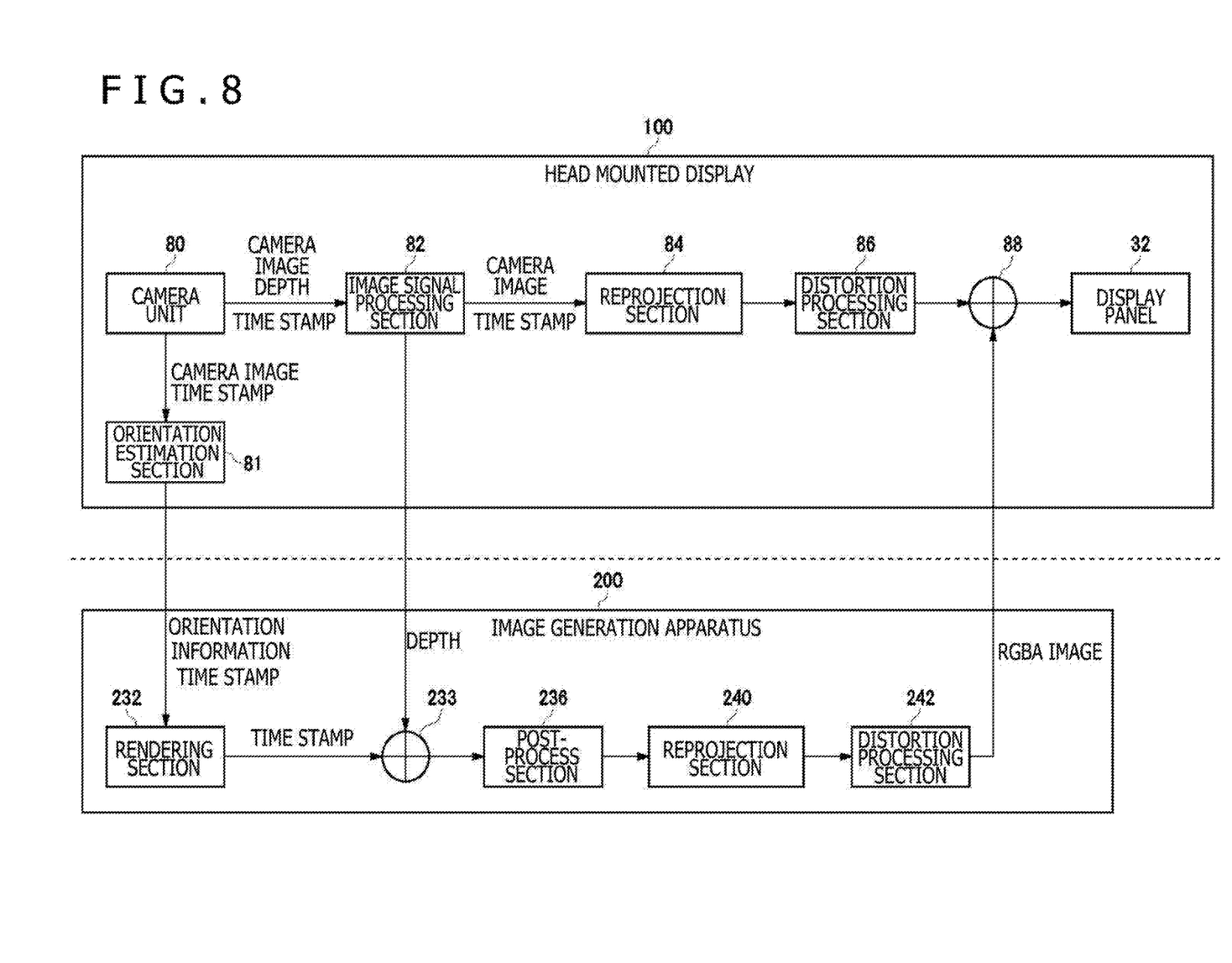
FIG. 8 is an explanatory diagram of a configuration of an image generation system according to the first embodiment for superimposing a CG image on a camera image to generate an augmented reality image.

FIG. 8 is an explanatory diagram of a configuration of an image generation system according to the first embodiment for superimposing a CG image on a camera image to generate an augmented reality image.

The camera image in the outside world captured by the camera unit 80 in the head mounted display 100, the depth information, and a type stamp are supplied to the image signal processing section 82. The camera image and the time stamp are also supplied to the orientation estimation section 81. The orientation estimation section 81 estimates the orientation information regarding the head mounted display 100 from the camera image, and supplies the orientation information and the time stamp to the rendering section 232. The image signal processing section 82 performs the image signal processing and the distortion correction processing on the camera image, and supplies the camera image and the type stamp to the reprojection section 84. The image signal processing section 82 transmits the depth information to the image generation apparatus 200 to supply the depth information to the image-with-alpha generation section 233.

The rendering section 232 in the image generation apparatus 200 generates a virtual object viewed from the viewpoint location and the line-of-sight direction of the user wearing the head mounted display 100, and supplies the CG image and the time stamp to the image-with-alpha generation section 233. The time stamp is passed from the image-with-alpha generation section 233 to the post-process section 236 and the reprojection section 240.

The image-with-alpha generation section 233 generates the CG image with alpha from the CG image on the basis of the depth information. The post-process section 236 post-processes the CG image with alpha. The reprojection section 240 converts the post-processed CG image with alpha into a CG image with alpha to fit the latest viewpoint location and the latest line-of-sight direction on the basis of the time stamp. The distortion processing section 242 performs distortion processing on the CG image with alpha after the reprojection. The final RGBA image after the distortion processing is transmitted to the head mounted display 100 and supplied to the AR superimposition section 88. This RGBA image is a CG image to which the alpha value indicating that the region to be superimposed on the camera image is transparent is set.

The reprojection section 84 in the head mounted display 100 converts the image-signal-processed and distortion-correction-processed camera image into a camera image to fit the latest viewpoint location and the latest line-of-sight direction on the basis of the time stamp, and supplies a resultant camera image to the distortion processing section 86. The distortion processing section 86 performs distortion processing on the camera image after the reprojection. The AR superimposition section 88 generates an augmented reality image by superimposing the CG image with alpha supplied from the image generation apparatus 200 on the distortion-processed camera image. The generated augmented reality image is displayed on the display panel 32.

Since the camera image captured by the camera unit 80 in the head mounted display 100 is not transferred to the image generation apparatus 200, the image generation system according to the first embodiment can superimpose the camera image captured at a high frame rate on the CG image generated by the image generation apparatus 200. Owing to this, the see-through video is not fed intermittently, and the user viewing the augmented reality video on the head mounted display 100 can feel connection to the real world.

A second embodiment will be described. While the head mounted display 100 is basically the same in configuration as that depicted in FIG. 6, the reprojection section 84 has a first reprojection section 84a for a camera image and a second reprojection section 84b for a CG image.

Figure 9:
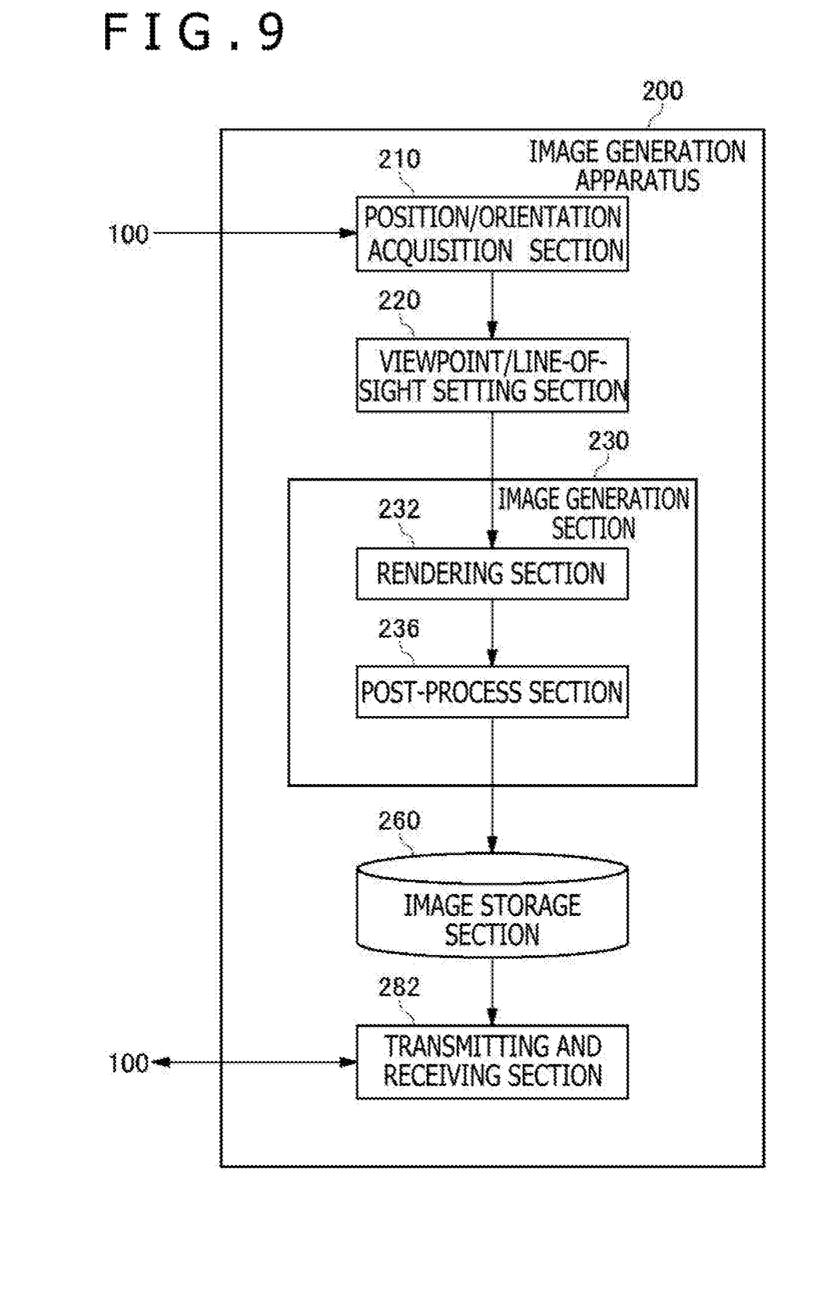
FIG. 9 is a functional configuration diagram of an image generation apparatus according to a second embodiment.

FIG. 9 is a functional configuration diagram of the image generation apparatus 200 according to the second embodiment.

The image generation apparatus 2000 according to the second embodiment does not receive the camera image captured by the camera unit 80 and the depth information from the head mounted display 100.

The image generation section 230 reads data necessary to generate computer graphics from the image storage section 260, generates a CG image by rendering an object in a virtual space, post-processes the CG image, and outputs the post-processed CG image to the image storage section 260.

The image generation section 230 includes the rendering section 232 and the post-process section 236.

The rendering section 232 generates the CG image by rendering an object in the virtual space viewed from the viewpoint location of the user wearing the head mounted display 100 in the line-of-sight direction in accordance with the viewpoint location and the line-of-sight direction of the user set by the viewpoint/line-of-sight setting section 220, and supplies the CG image to the post-process section 236.

The post-process section 236 performs post-processing on the CG image, post-processes the CG image in such a manner that the CG image appears natural and smooth, and stores the CG image in the image storage section 260.

The transmitting and receiving section 282 reads frame data of the CG image including the alpha value and depth information and generated by the image generation section 230 from the image storage section 260, and transfers the frame data as an RGBAD image to the head mounted display 100 through a communication interface capable of transferring an RGBAD image signal. The RGBAD image signal means herein an image signal obtained by adding the alpha value and a depth value to a color value of each of red, green, and blue per pixel.

Figure 10:
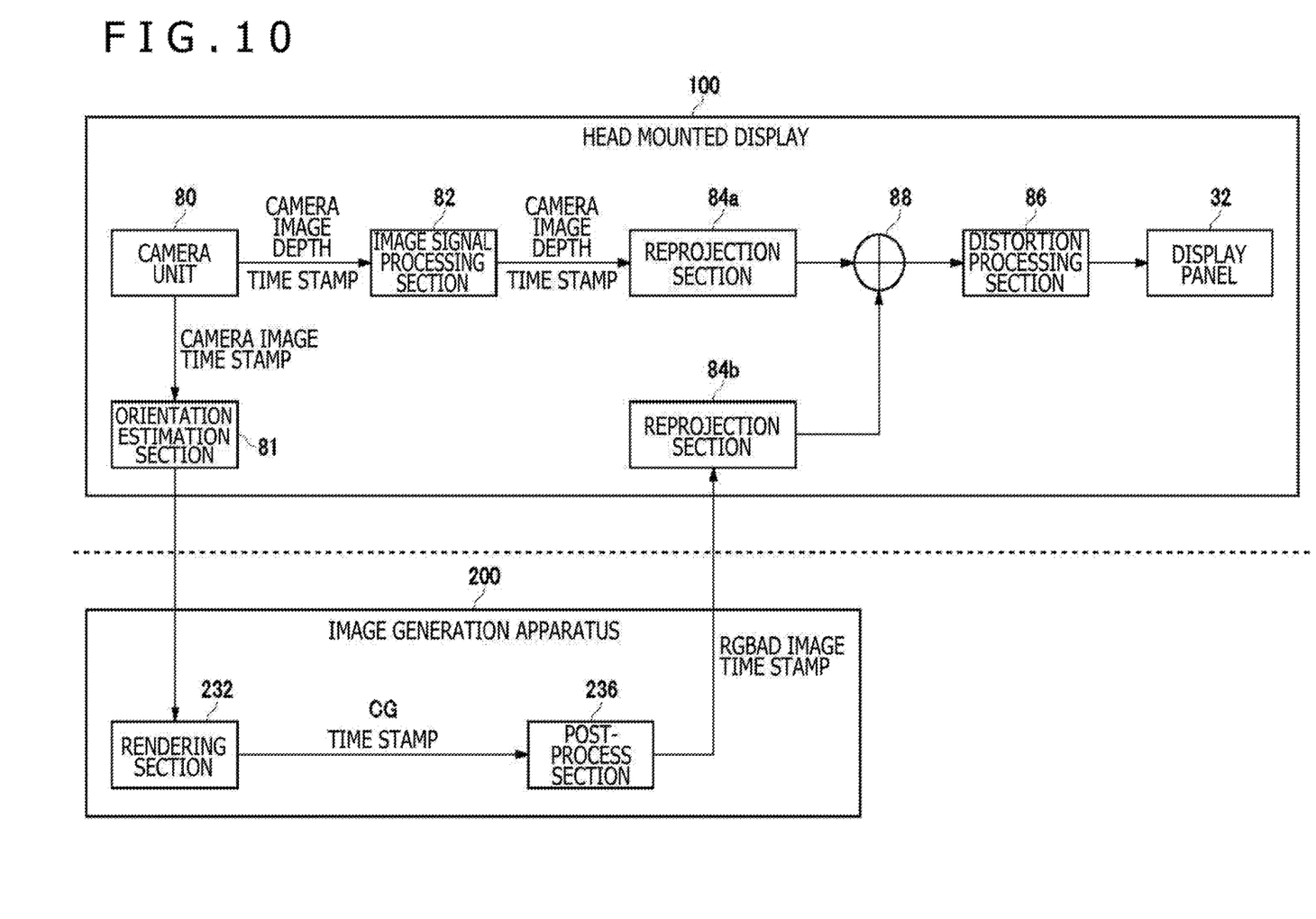
FIG. 10 is an explanatory diagram of a configuration of an image generation system according to the second embodiment for superimposing a CG image on a camera image to generate an augmented reality image.

FIG. 10 is an explanatory diagram of a configuration of an image generation system according to the second embodiment for superimposing a CG image on a camera image to generate an augmented reality image.

The camera image in the outside world captured by the camera unit 80 in the head mounted display 100, the depth information, and the type stamp are supplied to the image signal processing section 82. The camera image and the time stamp are also supplied to the orientation estimation section 81. The orientation estimation section 81 estimates the orientation information regarding the head mounted display 100 from the camera image, and supplies the orientation information and the time stamp to the rendering section 232. The image signal processing section 82 performs the image signal processing and the distortion correction processing on the camera image, and supplies the camera image, the depth information, and the type stamp to the first reprojection section 84a.

The rendering section 232 in the image generation apparatus 200 generates a virtual object viewed from the viewpoint location and the line-of-sight direction of the user wearing the head mounted display 100, and supplies the CG image and the time stamp to the post-process section 236.

The post-process section 236 post-processes the CG image, and transmits the post-processed CG image as the RGBAD image including the alpha value and the depth information with the time stamp to the head mounted display 100 to supply the RGBAD image to the reprojection section 84b.

The first reprojection section 84a in the head mounted display 100 converts the image-signal-processed and distortion-correction-processed camera image into a camera image to fit the latest viewpoint location and the latest line-of-sight direction on the basis of the time stamp, and supplies a resultant camera image to the AR superimposition section 88.

The second reprojection section 84b in the head mounted display 100 converts the CG image so as to fit the latest viewpoint location and the latest line-of-sight direction on the basis of the time stamp, and supplies a resultant CG image to the AR superimposition section 88. It is noted herein that, since the CG image includes the depth information, the second reprojection section 84b can perform the reprojection processing in consideration of not only a rotational component but also a translational component by use of the depth information.

It is noted herein that the first reprojection section 84a for the camera image and the second reprojection section 84b for the CG image are separately provided in the head mounted display 100 because it takes long time for rendering in the image generation apparatus 200 and the first and second reprojection sections 84a and 84b differ in difference amount to be corrected through reprojection. For example, the first reprojection section 84a needs to perform reprojection on one frame ahead, while the second reprojection section 84b needs to perform reprojection on two frames ahead.

The AR superimposition section 88 generates an augmented reality image by superimposing the reprojection-processed CG image by the second reprojection section 84b on the reprojection-processed camera image by the first reprojection section 84a, and supplies the augmented reality image to the distortion processing section 86. It is noted herein that, since each of the camera image and the CG image includes the depth information, the AR superimposition section 88 can perform superimposition processing per pixel using the depth information of each of the camera image and the CG image.

The distortion processing section 86 performs the distortion processing on the augmented reality image. The generated augmented reality image is displayed on the display panel 32.

Figure 11:
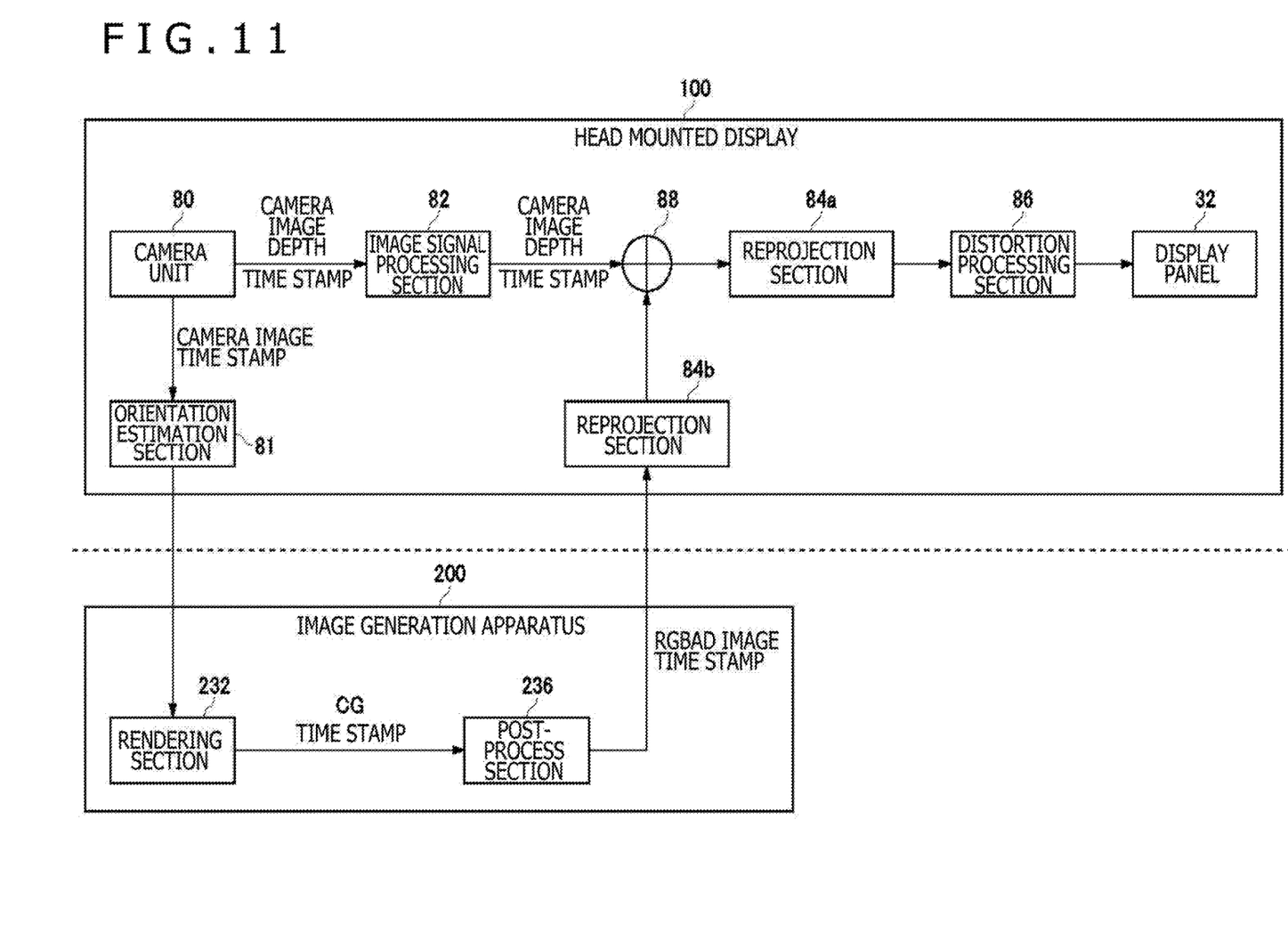
FIG. 11 is an explanatory diagram of a modification of the configuration of the image generation system according to the second embodiment for superimposing a CG image on a camera image to generate an augmented reality image.

FIG. 11 is an explanatory diagram of a modification of the configuration of the image generation system according to the second embodiment for superimposing a CG image on a camera image to generate an augmented reality image. Differences from the configuration of FIG. 10 will be described.

In the modification of FIG. 11, the first reprojection section 84a is provided in the latter stage of the AR superimposition section 88, and the image signal processing section 82 directly supplies the camera image, the depth information, and the type stamp to the AR superimposition section 88. The type stamp is passed from the AR superimposition section 88 to the first reprojection section 84a. The second reprojection section 84b converts the CG image so as to fit the latest viewpoint location and the latest line-of-sight direction on the basis of the time stamp, and supplies a resultant CG image to the AR superimposition section 88. The AR superimposition section 88 generates the augmented reality image by superimposing the reprojection-processed CG image by the second reprojection section 84b on the camera image. The first reprojection section 84a predicts output timing of the augmented reality image on the basis of the time stamp, converts the augmented reality image so as to fit the viewpoint location and the line-of-sight direction at the output timing, and supplies a resultant augmented reality image to the distortion processing section 86.

Since the CG image can be superimposed on the camera image captured at the high frame rate similarly to the first embodiment, the image generation system according to the second embodiment exhibits not only the advantages in that the see-through video is not fed intermittently and it is possible to provide the augmented reality video with a sense of reality but also the following advantages. Since the CG image including the depth information is transmitted to the head mounted display 100, it is possible to superimpose the CG image on the camera image with high accuracy while referring to the depth information per pixel on the head mounted display 100 side. Furthermore, the image generation system according to the second embodiment is applicable not only to the video see-through head mounted display 100 but also to an optical see-through head mounted display 100. Moreover, with the depth information, the reprojection section 84b in the head mounted display 100 can perform prediction and conversion of not only the rotational component but also the translational component and perform the reprojection processing with high accuracy by three-dimensional conversion per pixel.

Furthermore, since the reprojection processing is performed on the CG image on the head mounted display 100 side, the CG image can be converted so as to fit the viewpoint location and the line-of-sight direction just before display of the CG image on the display panel 32, and it is possible to provide the augmented reality image with high accuracy and with high followability. Moreover, since it is possible to alleviate the burden of the reprojection processing on the image generation apparatus 200 side, it is possible to spend more resources to rendering on the image generation apparatus 200 side.

Furthermore, in the case of using a display device such as a hologram display capable of reproducing even a virtual image distance of an object to be displayed, it is possible to display a virtual object in three-dimension (3D) while reflecting the depth information regarding the CG image.

The present invention has been described so far with reference to the embodiments. The embodiments are given as an example, and a person skilled in the art would understand that various modifications can be made for combinations of constituent elements and processing processes and that such modifications fall within the scope of the present invention.

While the embodiments in which the orientation estimation section 81 is provided in the head mounted display 100 have been described with reference to FIGS. 8, 10, and 11, the orientation estimation section 81 may be provided in the image generation apparatus 200 as a modification.

While the present embodiments have been described above with the video see-through head mounted display taken by way of example, the present embodiments are also applicable to a case of an optical see-through head mounted display having a display section configured with a half-mirror or the like and causing the user to visually identify the real space before the user. In the case of the optical see-through head mounted display, depth information regarding a camera image is compared with depth information regarding a CG image, and the CG image is deleted to allow the user to see through and visually identify the real space in a region where the object in the real space is present in front of the object in the virtual space. In the case of the optical see-through head mounted display, it is unnecessary to superimpose the CG image on the camera image. Hence, the image signal processing and the reprojection processing associated with the camera image are unnecessary, and the depth information from the camera unit 80 is used by the AR superimposition section 88.

REFERENCE SIGNS LIST

10 Control section, 20 Input interface, 30 Output interface, 32 Display panel, 40 Communication control section, 42 Network adapter, 44 Antenna, 50 Storage section, 64 Orientation sensor, 70 External input/output terminal interface, 72 External memory, 80 Camera unit, 81 Orientation estimation section, 82 Image signal processing section, 84 Reprojection section, 86 Distortion processing section, 88 AR superimposition section, 90 HDMI transmitting and receiving section, 92 Transmitting and receiving section, 100 Head mounted display, 200 Image generation apparatus, 210 Position/orientation acquisition section, 220 Viewpoint/line-of-sight setting section, 230 Image generation section, 232 Rendering section, 233 Image-with-alpha generation section, 234 AR superimposition section, 236 Post-process section, 240 Reprojection section, 242 Distortion processing section, 250 Image signal processing section, 252 Depth acquisition section, 260 Image storage section, 280 HDMI transmitting and receiving section, 282 Transmitting and receiving section, 300 Interface.

INDUSTRIAL APPLICABILITY

The present invention is applicable to an image generation field.

The invention claimed is:

1. An image generation system comprising:
a head mounted display; and
an image generation apparatus;
the image generation apparatus including
a rendering section that renders an object in a virtual space to generate a computer graphics image,
an image-with-alpha generation section that generates a computer graphics image with alpha on a basis of depth information regarding a captured image in a real space provided from the head mounted display,
a first reprojection section that converts the computer graphics image with alpha so as to fit a new viewpoint location or a new line-of-sight direction, and
a transmitting section that transmits the reprojection-processed computer graphics image with alpha to the head mounted display; and
the head mounted display including
a second reprojection section that converts the captured image in the real space so as to fit the new viewpoint location or the new line-of-sight direction,
a receiving section that receives the computer graphics image with alpha from the image generation apparatus, and
a superimposition section that superimposes the computer graphics image with alpha on the reprojection-processed captured image in the real space to generate an augmented reality image.

2. An image generation method comprising:
rendering an object in a virtual space to generate a computer graphics image;
generating a computer graphics image with alpha on the basis of depth information regarding a captured image in a real space provided from a head mounted display;
converting the computer graphics image with alpha so as to fit a new viewpoint location or a new line-of-sight direction;
transmitting the reprojection-processed computer graphics image with alpha to the head mounted display;
converting the captured image in the real space so as to fit the new viewpoint location or the new line-of-sight direction in the head mounted display; and
superimposing the computer graphics image with alpha on the reprojection-processed captured image in the real space to generate an augmented reality image in the headmounted display.

3. The image generation method of claim 2, further comprising:
receiving the computer graphics image with depth information;
and
generating the augmented reality image by superimposing the reprojection-processed computer graphics image with the depth information on the reprojection-processed captured image in the real space with reference to the depth information per pixel.

4. An image generation system comprising:
a head mounted display; and
an image generation apparatus;
the image generation apparatus including
a rendering section that renders an object in a virtual space to generate a computer graphics image, and
a transmitting section that transmits the computer graphics image together with depth information to the head mounted display for superimposing the computer graphics image on a captured image in a real space; and
the head mounted display including
a first reprojection section that converts the captured image in the real space so as to fit a new viewpoint location or a new line-of-sight direction,
a receiving section that receives the computer graphics image with the depth information from the image generation apparatus,
a second reprojection section that converts the computer graphics image so as to fit the new viewpoint location or the new line-of-sight direction, and
a superimposition section that generates an augmented reality image by superimposing the reprojection-processed computer graphics image with the depth information on the reprojection-processed captured image in the real space with reference to the depth information per pixel.

* * * * *